United States Patent [19]

Juergensen et al.

[11] 4,404,596
[45] Sep. 13, 1983

[54] METHOD AND APPARATUS FOR THE CORRECTION OF THE POSITION ERROR OF A MULTIFACETED ROTATING MIRROR

[75] Inventors: Heinrich Juergensen, Raisdorf; Thomas Zelenka, Kiel, both of Fed. Rep. of Germany

[73] Assignee: Dr. Ing. Rudolf Hell GmbH, Fed. Rep. of Germany

[21] Appl. No.: 326,526

[22] Filed: Dec. 2, 1981

[30] Foreign Application Priority Data

Dec. 11, 1980 [DE] Fed. Rep. of Germany ....... 3046584

[51] Int. Cl.³ .............................................. H04N 1/04
[52] U.S. Cl. .................................................... 358/293
[58] Field of Search ............... 358/206, 208, 285, 293, 358/199, 280, 296, 256; 350/6.7

[56] References Cited

U.S. PATENT DOCUMENTS

| 4,002,830 | 1/1977 | Brown et al. | 358/293 |
| 4,204,233 | 5/1980 | Swager | 358/293 |
| 4,270,131 | 5/1981 | Tompkin | 358/285 |

FOREIGN PATENT DOCUMENTS 2443379 3/1976 Fed. Rep. of Germany.

Primary Examiner—Robert L. Griffin
Assistant Examiner—Edward L. Coles

Attorney, Agent, or Firm—Hill, Van Santen, Steadman & Simpson

[57] ABSTRACT

Positional errors are corrected for a light beam which is deflected point and line-wise across a scanning surface by a polyhedral rotating mirror. For each mirror surface, the positional errors are measured in the line direction and perpendicular thereto at a plurality of measuring points oriented in the line direction in the area of the scanning surface. Correction values are generated which, during simultaneous error measurement, are changed until the positional errors are compensated by means of correction elements. The determined correction values are stored and are read out for continuous correction during the actual operation synchronously with the mirror surfaces simultaneously located in the beam path. Light deflectors are employed as correction elements. Employing the rotating mirror in a recording arrangement, transit time elements controlled by the correction values are disposed as correction elements in the signal path of the image signal for the correction of the positional errors in the line direction. If the image signal is stored, the frequency of the read clock can alternately be changed as a function of the correction values. The method is very accurate so that, in particular, errors caused by uneven mirror surfaces are corrected.

23 Claims, 7 Drawing Figures

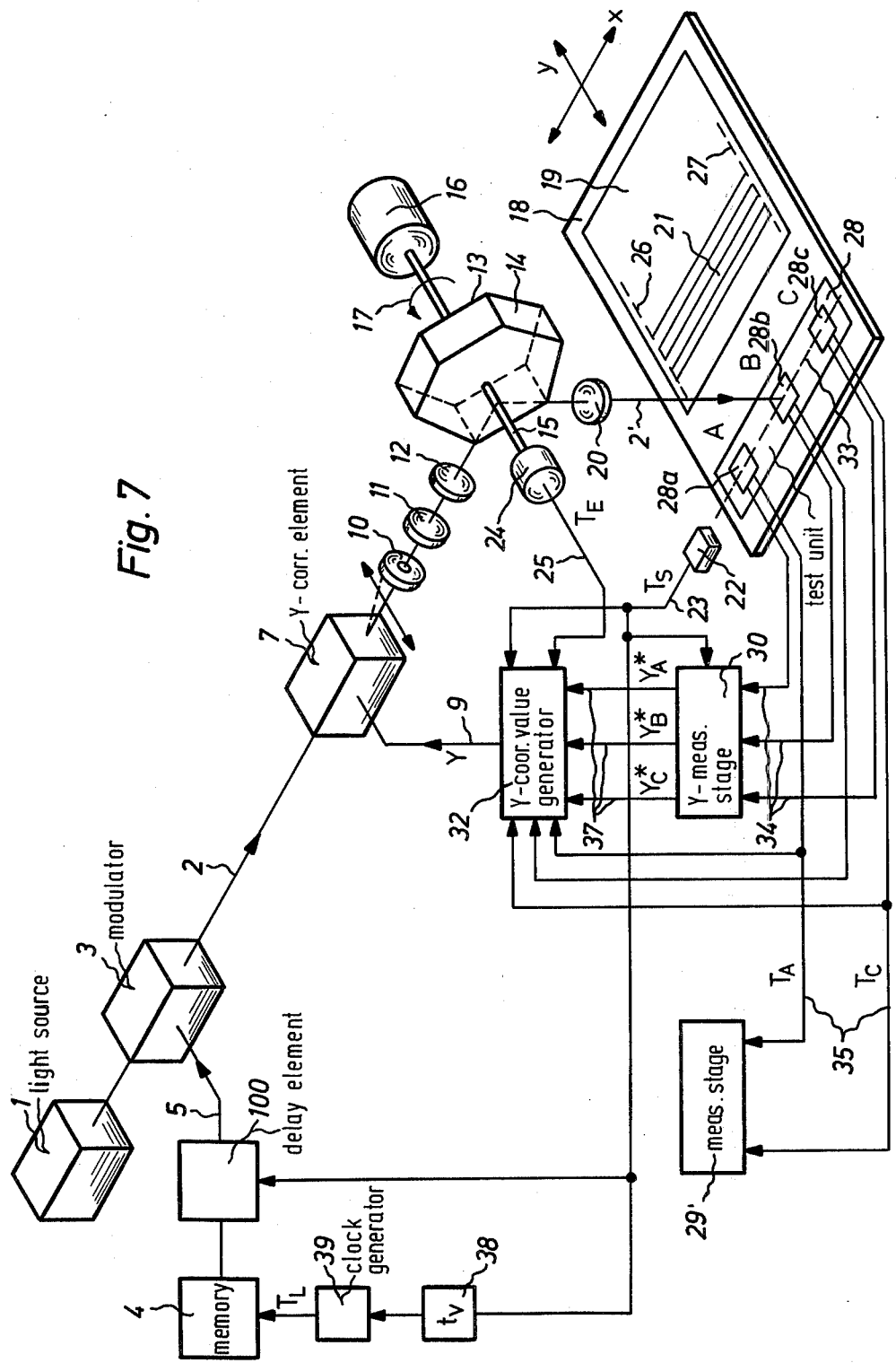

METHOD AND APPARATUS FOR THE CORRECTION OF THE POSITION ERROR OF A MULTIFACETED ROTATING MIRROR

BACKGROUND OF THE INVENTION

1. Field of the Invention

The present invention relates to the field of electronic reproduction technology, and in particular to a method and to an apparatus for the correction of positional errors of a light beam deflected across a surface point and line-wise by deflection system having at least one mirrored surface, the light beam moving at right angles to the deflection direction relative to the deflection system, and in which method positional errors are determined and are corrected by corresponding correction values.

2. Description of the Prior Art

Light beam deflection systems are employed in reproduction technology, for example, for the point and line-wise master scanning or for recording information.

In the case of scanning, a light beam is deflected point and line-wise across a master by a polyhedral rotating mirror. The scanning light reflected by the master is converted into an image signal by an opto-electronic transducer.

In the case of information recording, the light beam is intensity-modulated as a function of an image signal and is deflected point and line-wise across a recording medium (film) by a polyhedral rotating mirror. The master or the recording medium move either continuously or by steps at right angles to the deflection direction of the light beam.

In order to provide good reproduction quality, it is required, among other things, that the line spacings be identical, and that the line beginnings and line ends respectively lie precisely over one another. Due to optical and geometrical errors of the polyhedral rotating mirror and the positional errors of the light beam on the surface which are caused thereby, the reproduction quality, however, is considerably decreased.

The causes of these errors, for example, are the tolerances in the manufacture of the polyhedral rotating mirror and the deficiencies in the structure of the arrangement. Mirror surfaces which are not aligned parallel to the axis of rotation of a polyhedral rotating mirror and an unstable position of the axis of rotation cause positional errors on the surface at right angles to the deflection direction of the light beam which result in non-uniform line spacings.

Differing angles between adjacent mirror surfaces cause non-coincidence between the line beginnings and the line ends.

It has been shown, in practice, that mirror surfaces which are not flat and are not planar have a disruptive effect if a very high accuracy is to be achieved. Due to uneven mirror surfaces, the positional errors at right angles to the deflection direction become dependent on the deflection direction of the light beam or, respectively, on the line direction. Therefore, the light beam has a non-uniform angular velocity in the line direction as it does given a non-constant rotational speed of the polyhedral rotating mirror, as a result of which distortions occur within the lines. In addition, the described errors can change due to thermal effects or due to aging.

A correction arrangement for the positional errors of a polyhedral rotating mirror is already known from the U.S. Pat. No. 4,002,830 in which a correction deflector is disposed in the beam path between the light source and the polyhedral rotating mirror. In this arrangement, only one correction value is assigned to each mirror surface. Measures for measuring the positional errors and for generating correction values are not set forth.

A further correction arrangement is disclosed in the German published application No. 29 27 101 in which the positional errors at right angles to the deflection direction are corrected by deflector and the positional errors in the deflection direction are corrected by regulating the speed of a polyhedral rotating mirror. In this arrangement, also, only one correction value is generated for each mirror surface.

The known correction arrangements have the disadvantage that errors caused by non-planar surfaces are not corrected.

SUMMARY OF THE INVENTION

It is therefore the object of the present invention to provide a method for the correction of positional errors in which the accuracy of error measurement and error correction is increased in such a manner that errors caused by non-planar surfaces are also corrected and, therefore, a high reproduction quality is attainable.

According to the invention, a method is proposed for correcting positional errors of a light beam which is deflected point and line-wise across a surface by a deflection system having at least one mirror surface, in which the light beam moves at right angles to the deflection direction relative to the deflection system, and in which the positional errors are detected and corrected by corresponding correction values. More specifically, the invention is characterized in that, before the actual operation, a plurality of positional errors for each mirror surface are measured in the deflection direction (X-positional errors) and at right angles thereto (Y-positional errors), the positional errors being measured at measuring points oriented in the line direction in the area of the mirror surface. For the purpose of correcting positional errors, correction values are generated for each mirror surface and are changed, given simultaneous checking of the positional errors, until the positional errors are compensated. The correction values thereby obtained are stored. For the purpose of continuous correction during actual operation, the correction values assigned to the individual mirror surfaces which are stored are output synchronously with the movement of the deflection system.

The X-positional errors and the Y-positional errors are corrected by deflections of the light beam which are dependent upon the correction values.

For the purpose of a line-wise recording on a surface, the light beam is intensity-modulated as a function of an image signal. The Y-positional errors are corrected by control deflection of the light beam and the X-positional errors are corrected line-wise by controlled change of transit time of the image signal.

For the purpose of a line-wise recording on a surface, the light beam is intensity-modulated as a function of image data which are read from a memory by a read clock. The Y-positional errors are corrected by controlled deflection of the light beam. For the purpose of a line-wise correction of the X-positional errors, the frequency of the read clock is changed.

According to another feature of the invention, the reading of the image data is started at the line beginning by a synchronizing start pulse.

According to another feature of the invention, the correction deflection is executed before the line-wise deflection of the light beam.

According to another particular feature of the invention, a correction function is generated for each mirror surface from the assigned correction values by interpolation.

According to another feature of the invention, the polyhedral rotating mirror (polygon mirror) is employed as the deflection system.

According to a further feature of the invention, in order to determine the Y-positional errors, a respective photo-electrical measuring element having two photosensitive surfaces disposed at right angles to the deflection direction is employed. The photo currents are integrated and the Y-positional error is determined by differential formation of the integrated photo currents.

According to another feature of the invention, a differential photo diode is employed as the measuring element.

According to a further feature of the invention, a position detector has a high-resistant, light-sensitive material and is employed as the measuring element.

In order to determine the X-positional errors, according to another feature of the invention, measurements are made of the difference of transit time of the light beam between the measuring points.

According to a further feature of the invention, an acousto-optical modulator is employed for the simultaneous intensity-modulation and deflection of the light beam.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 7 is a schematic representation of a recording device of the type illustrated in FIG. 1 having a different exemplary embodiment of a correction arrangement.

DESCRIPTION OF THE PREFERRED EMBODIMENTS

Figure 1:
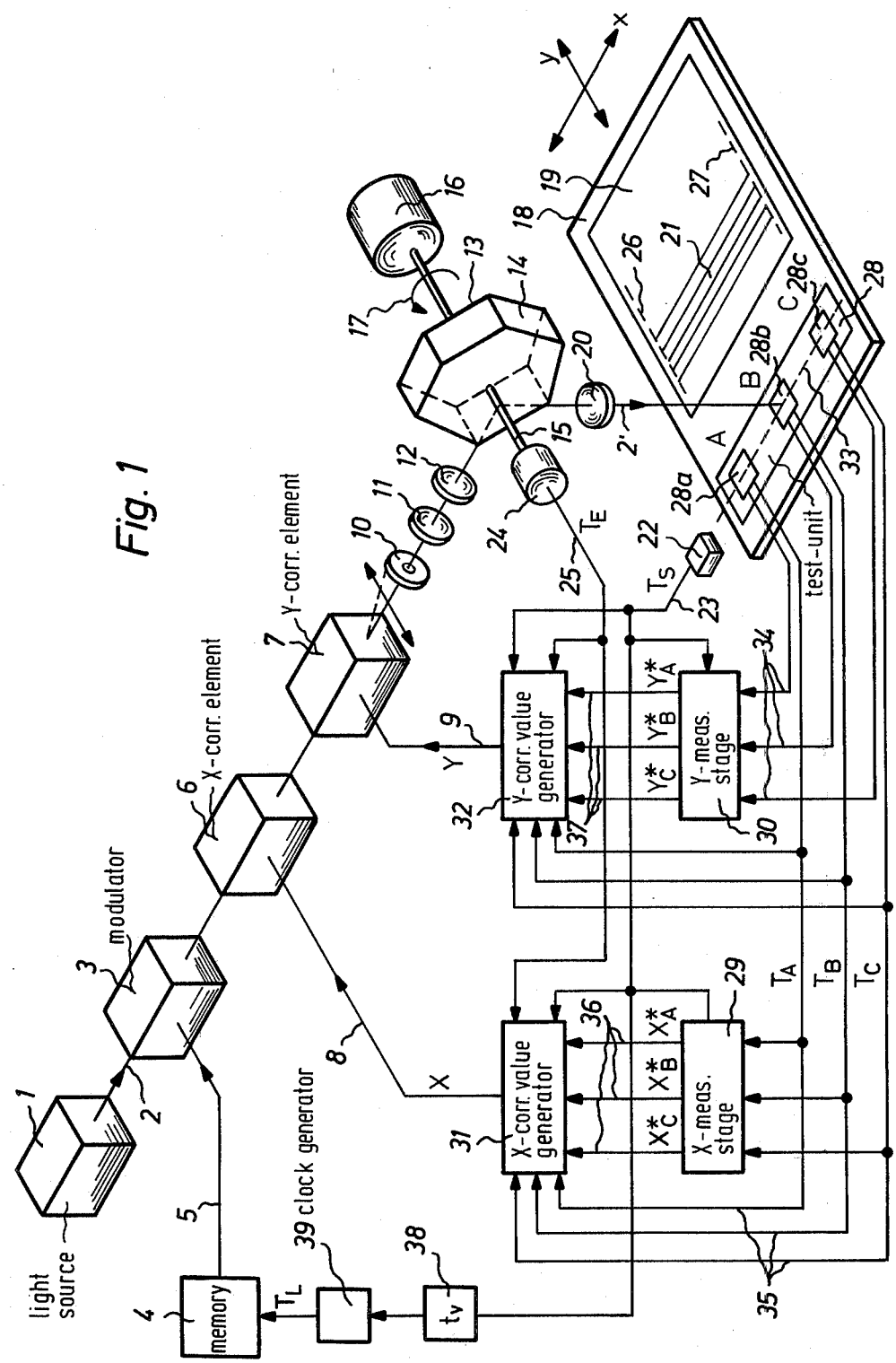
FIG. 1 is a schematic representation of a recording element having a correction arrangement.

Referring to FIG. 1, a recording arrangement is illustrated including a light beam deflection system in the form of a polyhedral rotating mirror for the line-wise recording of information and a correction arrangement for the positional errors of the light beam caused by the polyhedral rotating mirror.

In FIG. 1, a light source 1, for example a laser generator, generates a light beam 2 which has its intensity modulated in a light modulator 3 as a function of recording data. The light modulator 3, for example, is an acousto-optical modulator (AOM) of the type 1201 C of the Isomet Company. The recording data are called up from a storage medium, for example a digital memory 4, and are supplied to the light modulator 3 via a line 5. The intensity-modulated light beam 2 is deflected from the optical axis in an X-correction element 6 and in a following Y-correction element 7 for the purpose of correcting the positional errors. Light deflectors, for example, acousto-optical deflectors of the type LD50 of the Isomet Company or any other type of light deflector can be employed as the correction elements 6 and 7, which are controlled by correction values on the lines 7 and 8. A single acousto-optical modulator can also be employed for the intensity modulation and for the deflection of the light beam. Passing through a pin-hole diaphragm 10 for suppressing parasitic light beams, and through lenses 11 and 12 for expanding the light beam 2, the corrected light beam 2 strikes a rotating polyhedral rotating mirror 13 (polygon rotating mirror) with m mirror surfaces 14 whose axis of rotation 15 is aligned perpendicular to the optical axis of the light beam 2. In the exemplary embodiment of FIG. 1, the polyhedral rotating mirror 13 has m=6 mirror surfaces 14. A motor 16 drives the polyhedral rotating mirror 13 in the direction of an arrow 17 with a constant angular velocity. A recording medium 19, for example, in the form of a film, is disposed on a flat bed recording support 18. Due to the rotation of the polyhedral rotating mirror 13, the light beam 2', reflected from the mirror surfaces 14 and focused on the recording medium 19 by a lens 20, is continuously deflected across the recording medium 19 in the X-direction (line direction). Simultaneously, the flat bed recording element 18 executes a feed motion in the Y-direction (feed direction) either in steps or continuously, which is perpendicular to the recording direction. In this manner, the deflected light beam 2' exposes lights 21 lying next to one another on the recording medium 19. In the illustrated exemplary embodiment of the polyhedral rotating mirror 13 having m=6 mirror surfaces 14, six lines 21 are therefore recorded during a single revolution of the mirror.

On the occasion of each incident light beam, an opto-electronic pulse generator 22 disposed outside of the flat bed recording support 18 and in the deflection plane of the light beam 2' generates a start pulse $T_S$ on a line 23, i.e. six start pulses $T_S$ per mirror revolution given m=6 mirror surfaces 14. A further pulse generator 24, which is coupled to the axis of rotation 15 of the polyhedral rotating mirror 13, respectively generates an end pulse $T_E$ on a line 25 after a mirror revolution.

As already mentioned above, the mirror surfaces 14 which are not aligned parallel to the axis of rotation 15 and an unstable position of the axis of rotation 15 cause positional deviations of the recording light beam 2' on the recording medium 19, which deviations are perpendicular to the recording direction and are to be designated, in brief, below as Y-positional errors. The Y-positional errors which are dependent on the recording direction due to uneven mirror surfaces 14 result in unequal line spacings. Differing angles between adjacent mirror surfaces 14 cause differing line beginnings and line ends from line-to-line. Unevenness in the mirror surfaces 14 leads to deviations of the recording light beam 2', deviations, in particular, from those positions in the line direction which it is actually to assume its specific times, i.e. lead to a non-uniform angular velocity of the light beam. These deviations, referred to in brief below as X-positional errors, result in distortions within a line.

However, it is required for good recording quality that the lines 21 begin on an imaginary line 26 which extends perpendicular to the recording direction and end at a line 27 which is parallel thereto and that the line spacings are constant. Without a correction of the positional errors, these requirements cannot be met.

A correction arrangement according to the present invention for positional errors of the polyhedral rotating mirror 13 comprises a test unit 28, an X-measuring stage 29, a Y-measuring stage 30, an X-correction value generator 31, and a Y-correction value generator 32, as well as the X-correction element 6 and the Y-correction element 7 in the beam path between the light source 1 and the polyhedral rotating mirror 13.

Within the exploited width of the flat bed recording support 18, the test unit 28, in the form of a measuring bar, comprises a plurality of measuring elements disposed next to one another on a reference line 33 for the purpose of determining the light beam deviation in the X direction and in the Y direction. In the exemplary embodiment, three measuring elements 28a, 28b and 28c are provided at the measuring points A, B and C, whereby the measuring element 28a is disposed in the area of the line beginning, the measuring element 28c is disposed in the area of the line end and the measuring element 28b is disposed approximately in the line center.

The test unit 28 is a fixed component of the flat bed recording support 18. Alternatively, the test unit 28 for measurement can be attached to the flat bed recording support 18 or can be inserted into the light beam path instead of the flat bed recording support 18.

For the determination of the positional errors in a test phase before recording, with the polyhedral rotating mirror 13 rotating during the test phase, the flat bed recording support 18 is shifted in the Y-direction to such a degree that the measuring elements 28a, 28b and 28c, as illustrated in FIG. 1, lie in the deflection plane of the light beam 2'. The Y-positional errors measured in the individual measuring points A, B and C along the recording direction by the measuring elements 28a, 28b and 28c are transmitted to the Y-measuring stage 30 by way of a pair of lines 34 and are there converted into the measuring value triads $Y_A^*$, $Y_B^*$ and $Y_C^*$ for each mirror surface 14.

For the purpose of determining the X-positional errors, measurements of the difference of transit time for the light beam 2' are carried out between the pulse generator 22 and the measuring element 28a ($\Delta t_1$), between the measuring elements 28a and 28b ($\Delta t_2$), as well as between the measuring elements 28b and 28c ($\Delta t_3$). The pulses measured in the pulse generator 22 and in the measuring elements 28a, 28b and 28c when the light beam 2' passes thereover are supplied to the X-measuring stage 29 via a line 23 and the lines 34 and are employed there for the purpose of measuring the time difference. The measured time differences $\Delta t_1$, $\Delta t_2$ and $\Delta t_3$ are converted into the measured value triads $X_A^*$, $X_B^*$ and $X_C^*$ for each mirror surface 14.

In a correction phase, subsequent to the mesuring phase, the X-correction value generator 31 and the Y-correction value generator 32 generate correction value triads $X_A$, $X_B$ and $X_C$, as well as $Y_A$, $Y_B$ and $Y_C$, which increase in the direction of the required correction, and which are serially forwarded, in coincidence with the mirror surfaces 14 now situated in the beam path, to the X-correction element 6 and the Y-correctional element 7 via the lines 8 and 9. The correction elements 6 and 7 correct the positional errors step-by-step, whereby the correction operation is continuously monitored by the test unit 28. For that purpose, those respective measured value triads $X_A^*$, $X_B^*$ and $X_C^*$, as well as $Y_A^*$, $Y_B^*$ and $Y_C^*$ which are assigned to the mirror surface 14 now located in the beam path are forwarded via the lines 36 and 37 to the X-correction value generator 31 and to the Y-correction value generator 32.

The transmission of the measured value triads to the correction value generators 31 and 32 and of the correction value triads to the correction elements 6 and 7, in synchronization with the rotation of the polyhedral rotating mirror 13, is controlled by the start pulses $T_S$ on the line 23 and the end pulses $T_E$ on the line 25.

The step-by-step correction of the positional errors is continued until the measured deviations have been compensated. The correction values thereby achieved are stored in the corresponding correction value generators 31 and 32 and are output during the actual recording phase for the continuous correction of the positional errors.

Assuming that the range of correction values lies between $Y=0$ and $Y=Y_n$, whereby the maximum deflection of the light beam in the $-Y$ direction is assigned the correction value $Y=0$, the maximum deflection in the $+Y$ direction is assigned to the correction value $Y=Y_m$ and the zero deflection is assigned to the correction value $Y_m/2$.

In the recording phase, the start pulses $T_S$ are delayed in a stage 38 by that time which corresponds to the transit time of the light beam 2' between the pulse generator 22 and the desired line beginning on the recording medium 19.

A clock generator 39 generates the read clock for the digital memory 4. Every delayed start pulse $T_S$ restarts the read clock, so that the first respective image information of a line is read and recorded precisely at the desired line beginning.

In an advantageous further development of the invention, the X-correction value generator 31 and the Y-correction value generator 32, respectively exhibit an interpolation stage in which a correction function $X=f(x)$ or, respectively, $Y=f(x)$ for each mirror surface 14 is formed from each correction value triad $X_A$, $X_B$ and $X_C$, respectively, $Y_A$, $Y_B$ and $Y_C$ by means of linear interpolation so that a correction value is defined for each point of incidence of the light beam 2'.

The correction method according to the present invention, therefore, has the advantage that a continuous deflection correction occurs within each mirror surface 14 by means of which, in particular, errors caused due to uneven or non-planar mirror surfaces are compensated and high-accuracy can be achieved.

Also included within the present invention is the fact that the described correction arrangement can also be employed given a master scanning device or given other light beam deflection systems.

Figure 2:
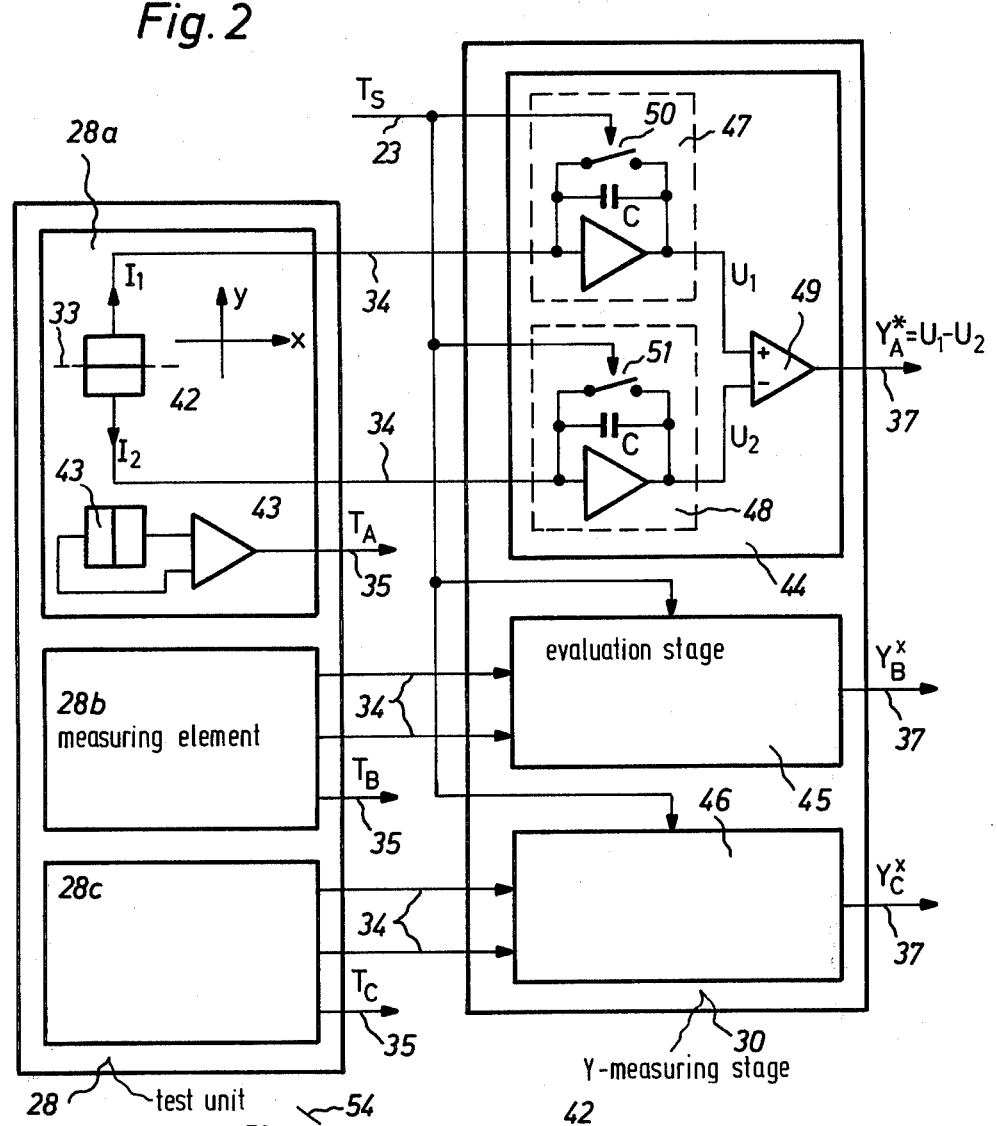
FIG. 2 is a schematic diagram of an exemplary embodiment of a test installation and of a Y-measuring state.

FIG. 2 illustrates an exemplary embodiment of the test unit 28 in interaction with the Y-measuring stage 30. As shown in FIG. 1, the test unit 28 includes three identical measuring elements 28a, 28b and 28c of which only the measuring element 28a is illustrated in detail in FIG. 2.

The measuring element 28a contains a first sensor 42 for measuring the Y-positional error and a second sensor 43 for measuring the X-positional error. The sensors, for example, comprise two respective individual photo diodes or a differential photo diode. The light-sensitive surfaces of the sensor 42 are aligned parallel to the reference line 33 and those of the sensor 43 are aligned perpendicular to the reference line 33. Instead of photo diodes, positional detectors having a high-resistant, light-sensitive material can also be employed.

In the Y-measuring stage 30, identically-constructed evaluation stages 44, 45 and 46 are assigned to the sensors, and only the evaluation stage 44 is illustrated in detail.

The photo currents $I_1$ and $I_2$ of the sensor 42 generated by the incident light beam arrive by way of the double line 34 at a pair of integrators 47 and 48. The voltages $U_1$ and $U_2$ derived at the outputs of the integrators 47 and 48 are supplied to a differential stage 49, a differential amplifier, in which the measured value $Y_A{}^* = U_1 - U_2$ is generated.

The integrators 47 and 48 are constructed of operational amplifiers which are back-coupled across respective capacitors C. Electronic switches 50 and 51 are connected in parallel to the capacitor C, respectively, the switches being symbolically illustrated on the drawing by mechanical switches. The switches are respectively closed by the start pulse $T_S$ on the line 23 and the capacitors C are discharged, so that the measured value of a mirror surface 14 is erased before the corresponding measured value of the subsequent mirror surface 14 is determined.

The integration of the photo currents $I_1$ and $I_2$ leads to a high measuring accuracy, since the noise of the small photo current is eliminated and an exact alignment of the measuring elements can be eliminated.

The photo currents of the sensor 43 are forwarded to a comparator 43' which generates a pulse $T_A$ when the light beam passes through the sensor 43. Together with the pulses $T_B$ and $T_C$, the pulse $T_A$ is output via the lines 35.

Figure 3:
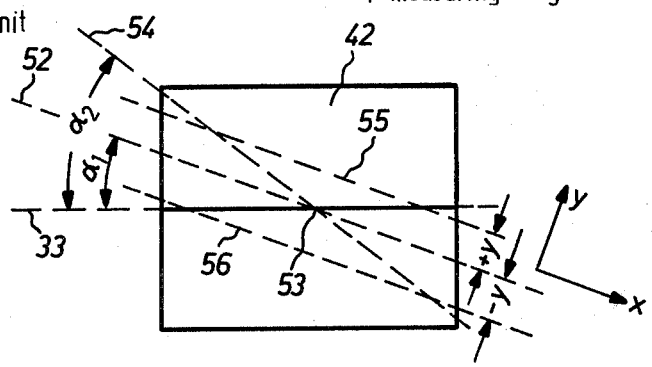
FIG. 3 shown on the same sheet as FIG. 2, is a graphic illustration of the measurement of the Y-positional errors.

The measurement of the Y-positional errors is illustrated in FIG. 3 in which the sensor 42 with the light-sensitive surfaces of the differential photo diode arranged parallel to the reference line 33 and various light beam paths are again illustrated. The light beam path 52 should extend through the center 53 of the surface in the recording direction or Y-direction at an angle $\alpha_1$ to the reference line 33. Assuming that the angle $\alpha_1$ has arisen due to an adjustment of the differential photo diode or, respectively, of the reference line 33 with respect to the Y-direction was not precise. The amount of light energy respectively absorbed by the surfaces is equal to ($I_1 = I_2$) and the measured value is $Y=0$, i.e. the light beam path 52 corresponds to the reference path without positional error. The measured value $Y=0$ also derives in the case of the light beam path 54 extending through the center 33 of the surface at an angle $\alpha_2$. It can be seen therefrom that a precise alignment of the differential photo diode with respect to the Y-direction can be eliminated. The light beam paths 55 and 56, on the other hand, exhibit positional errors $\pm y$. In this case, the amount of light energy respectively absorbed by the surfaces is unequal ($I_1 \neq I_2$) and the measured value Y is proportional to the positional error.

Figure 4:
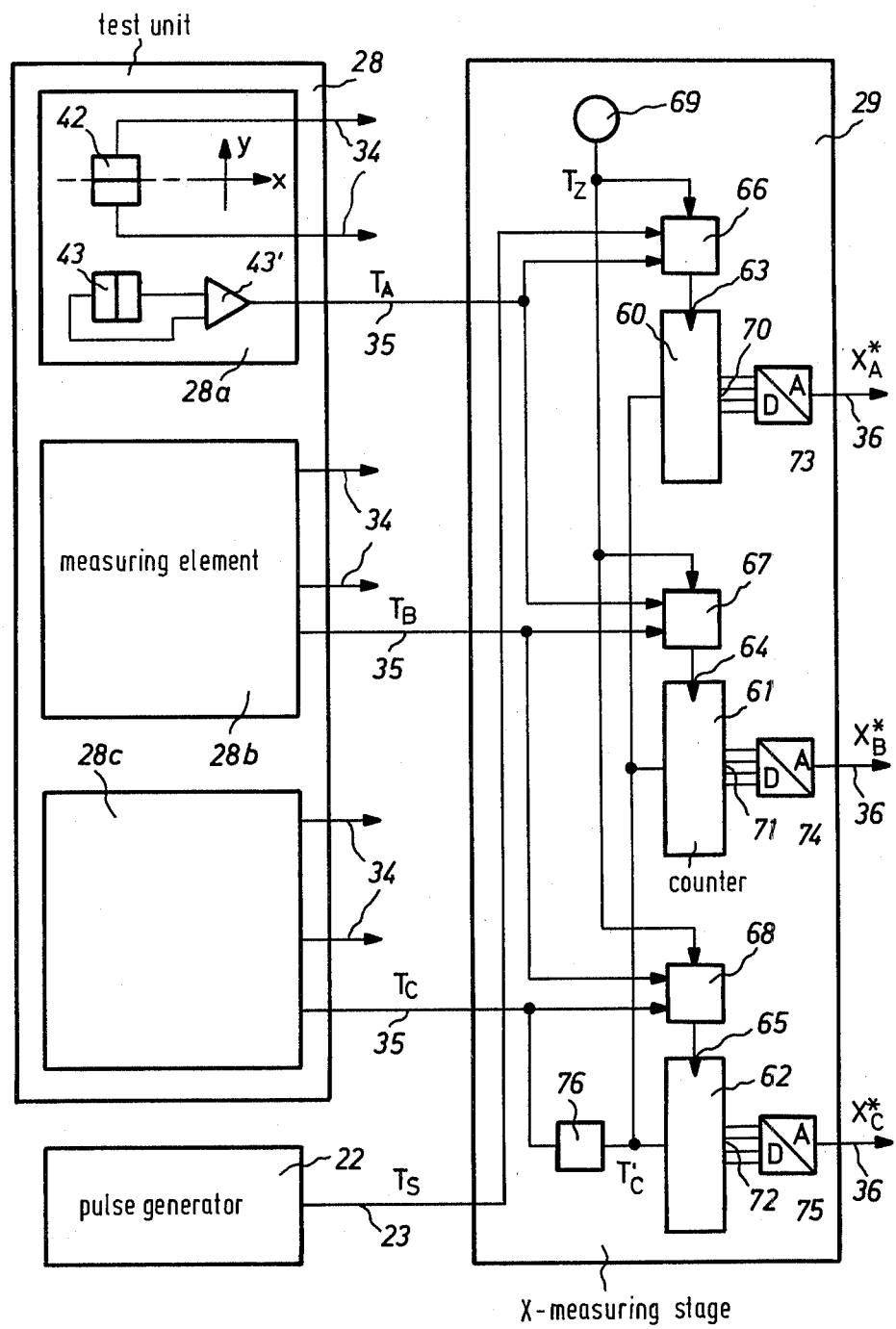
FIG. 4 is a schematic diagram of an exemplary embodiment of an X-measuring stage.

FIG. 4 illustrates an exemplary embodiment of the X-measuring stage 29, in conjunction with the pulse generator 22 and the test unit 28.

For measuring the time differential, three digital counters 60, 61 and 62 are provided in the X-measuring stage 29, the counters have respective clock inputs 63, 64 and 65 which are connected by way of respective gate circuits 66, 67 and 68 to a clock generator 69 for generating a counting clock sequence $T_Z$. The counting clock sequence $T_Z$ is switched on and off via the gate circuits 66, 67 and 68 by the start pulses $T_S$ generated in the pulse generator 22 and via the pulses $T_A$, $T_B$, and $T_C$ generated by the sensors 43 in the measuring elements 28a, 28b and 28c, so that the respective counter readings Z are proportional to the time differentials $\Delta t_1$, $\Delta t_2$ and $\Delta t_3$ between the pulses which turn on and the pulses which turn off. Three digital/analog converters 73, 74 and 75 are connected to the outputs 70, 71 and 72 of the digital counters 60, 61 and 62, the counter reading Z being converted in the digital/analog converters into the analog measured value triads $X_A{}^*$, $X_B{}^*$ and $X_C{}^*$ for each mirror surface 14, which triads are proportional to the measured time differentials $\Delta t_1$, $\Delta t_2$ and $\Delta t_3$. The digital counters 60, 61 and 62 are respectively reset at the end of a mirror surface 14 by a pulse $T_C{}'$ which is delayed in a time delay stage 76, so that the digital counters for the measurement of the time differential are prepared for the following mirror surface.

Figure 5:
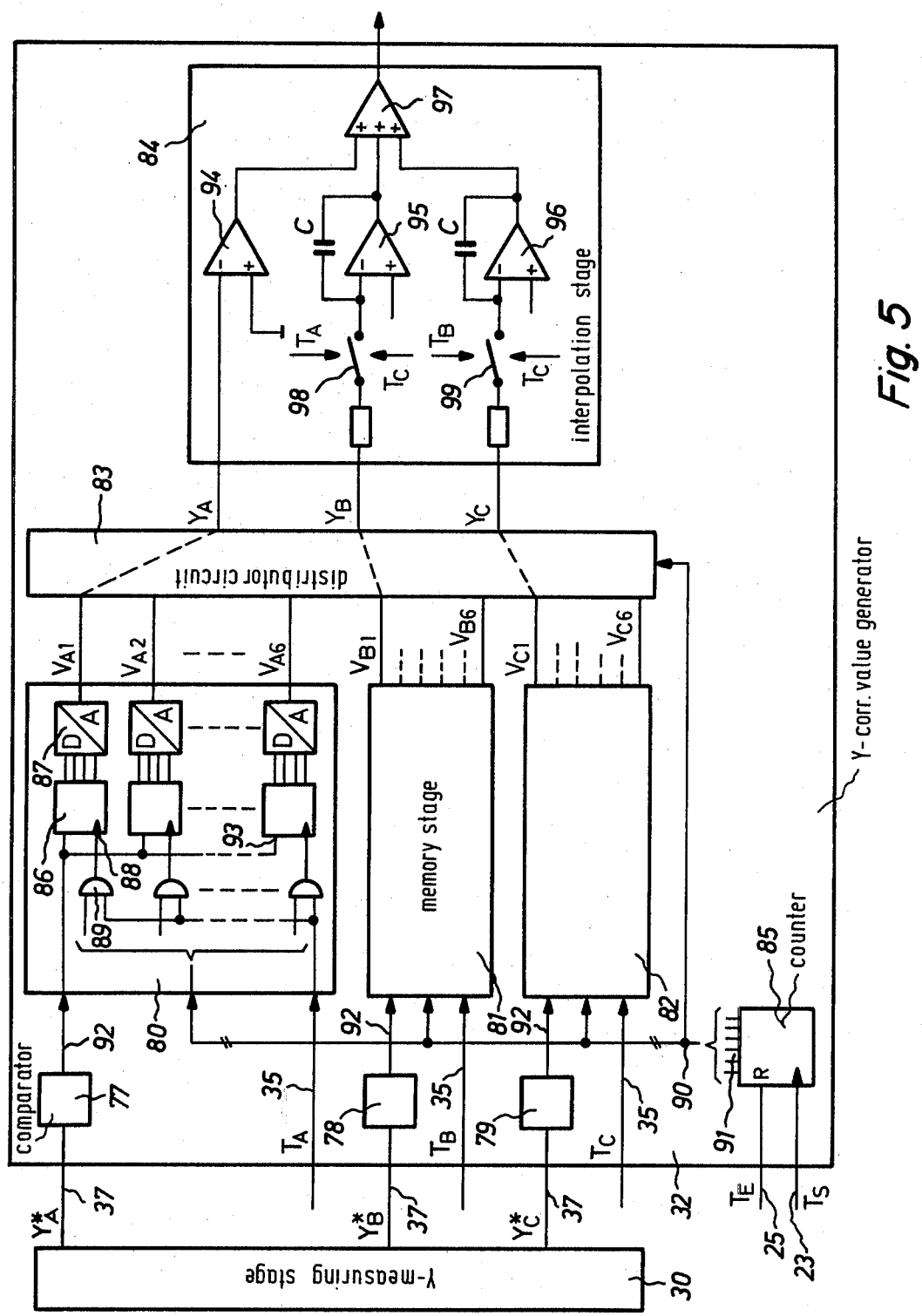
FIG. 5 is a schematic diagram of an exemplary embodiment of a correction value generator.

FIG. 5 illustrates an exemplary embodiment of the Y-correction value generator 32 or, respectively, the X-correction value generator 31 which are identically constructed.

The Y-correction value generator 32 comprises three comparators 77, 78 and 79, three memory stages 80, 81 and 82, a distributor circuit 83, an interpolation stage 84 and a mirror surface counter 85.

During the correction phase, the memory stages 80, 81 and 82 generate the correction values for the mirror surfaces 14 and store the values achieved in the compensation of the Y-positional errors for later recording. The memory stage 80 generates and stores the correction values for the measured point A, namely the correction values $Y_{A1}$–$Y_{A6}$ for $N=6$ mirror surfaces in the exemplary embodiment; the memory stage 81 generates and stores the correction values $Y_{B1}$–$Y_{B6}$ for the measuring point B; and the memory stage 82 generates and stores the correction values $Y_{C1}$–$Y_{C6}$ for the measuring point C.

The memory stages 80, 81 and 82 are identically constructed, so that only the memory stage 80 is shown in detail in FIG. 5. The memory stage 80 comprises six forward/backward counters 86 with the respective following digital/analog converters 87. A plurality of AND gates 89 are connected to the clock inputs 88 of the forward/backward counters 86. The AND gates 89 are charged with pulses $T_A$ on the line 35 which are respectively emitted upon occurrence of the light beam 2' at the measuring location A. The AND gates 89 are controlled by the six output signals of the mirror surface counter 85 on the lines 90. In the mirror surface counter 85, the start pulses $T_S$ on the line 23 are counted in at the beginning of each mirror surface 14, so that the output signals of the outputs 91 of the mirror surface counter 85 characterize that mirror surface 14 which is now in the light path. After each mirror revolution, the mirror surface counter 85 is reset by the end pulses $T_E$ on the line 25. The measured value $Y_A{}^*$ generated by the Y-measuring stage 30 and provided with operational signs are converted in the comparator 77 into logical control signals in such a manner that a high level (H) is assigned to a positive measured value and a low level (L) is assigned to a negative measured value. The logical control signals on the lines 92 are supplied to the forward-/backward control inputs 93 of the forward/backward counters 86 and therefore determine whether the clocks $T_A$ are to be counted into the forward/backward counters 86 or are to be counted out of the counters.

The manner of operation of the memory stage 80 is as follows.

At each pass of the light beam 2' through the measuring location A, a pulse $T_A$ is forwarded onto the line 35. Those AND gates 89 which are assigned to the mirror surface 14 now located in the beam path are cyclically released by the corresponding output signals of the mirror surface counter 85. The positive or negative beam deviation detected during the passage of the light beam 2' through the measuring point A determine whether the pulses $T_A$ in transit through the released AND gates 89 are to be counted in or counted out of the appertaining forward/backward counter 86 or, respectively, whether the counter reading is to be increased or reduced, the counter reading being converted by the following digital/analog converter 87 into higher or lower correction values Y. In the correction phase, for example, given a positive beam deviation, the counter reading is increased by one bit and, therefore, the corresponding correction value is increased step-by-step, the positive beam deviation finally being compensated down to zero with the correction value. The counter reading achieved upon compensation is the stored correction value for the recording phase.

A distributor circuit 83, which is controlled by the output signals of the mirror surface counter 85 on the line 90, is provided for the serial and cyclical through-connection of the six connection value triads $Y_A$, $Y_B$ and $Y_C$ for the six mirror surfaces 14 to the interpolation stage 84, synchronously with the respective mirror surface 14 located in the beam path. The connections for the first mirror surface 14, by means of which the correction value of the triad $Y_{A1}$, $Y_{B1}$ and $Y_{C1}$ arrives at the interpolation stage 84, are indicated with broken lines.

The interpolation stage 84 comprises an amplifier 94, a first integrator 95, a second integrator 96 and a summing amplifier 97 connected to the amplifier 94 and to the integrators 95 and 96. The interpolation stage 84 forms correction functions with inverted operational signs from the correction value triads.

The inverting input of the amplifier 94 is charged with the correction value $Y_A$ and the non-inverting input is connected to ground. The inverting input of the first integrator 95 is charged via an electronic switch 98 with the correction value $Y_B$ and the inverting input of the second integrator is charged via a further electronic switch 99 with the correction value $Y_C$. The non-inverting inputs of the integrators 95 and 96 are connected to the voltage value $Y_m/2$.

At each mirror surface, the electronic switch 98 is turned on by the pulse $T_A$ and the electronic switch 99 is turned on by the pulse $T_B$, whereas the pulse $T_C$ respectively opens the switches 98 and 99. Switching means which are not illustrated and which are controlled by the start pulses $T_S$ discharge the capacitor C of the integrators 95 and 96, as in the evaluation stage 44 of FIG. 2.

With reference to an example, the linear interpolation sequence is as follows.

It is assumed that the discrete correction values $Y_A$, $Y_B$ and $Y_C$ of one mirror surface 14 are formed at the time $t_1$, $t_2$ and $t_3$ at which the light beam respectively passes the measuring points A, B and C. At the time $t_1$, the electronic switch 98 is closed by the pulse $T_A$ and the integrator 95 is charged with the correction value $Y_B$ and is started. In the case where $Y_B < Y_A$, the integrator 95 generates a negative output voltage which is subtracted in the summing amplifier 97 from the correction value $Y_A$ until the correction value $Y_B$ is reached at the time $t_2$. At the time $t_2$, the electronic switch 99 is closed and the integrator 96 is charged with the correction value $Y_C$ and is started. In the case where $Y_C > Y_B$, the integrator 96 now generates a positive output voltage which is added to the correction value $Y_B$ until, at the time $t_3$, the correction value $Y_C$ is reached.

Figure 6:
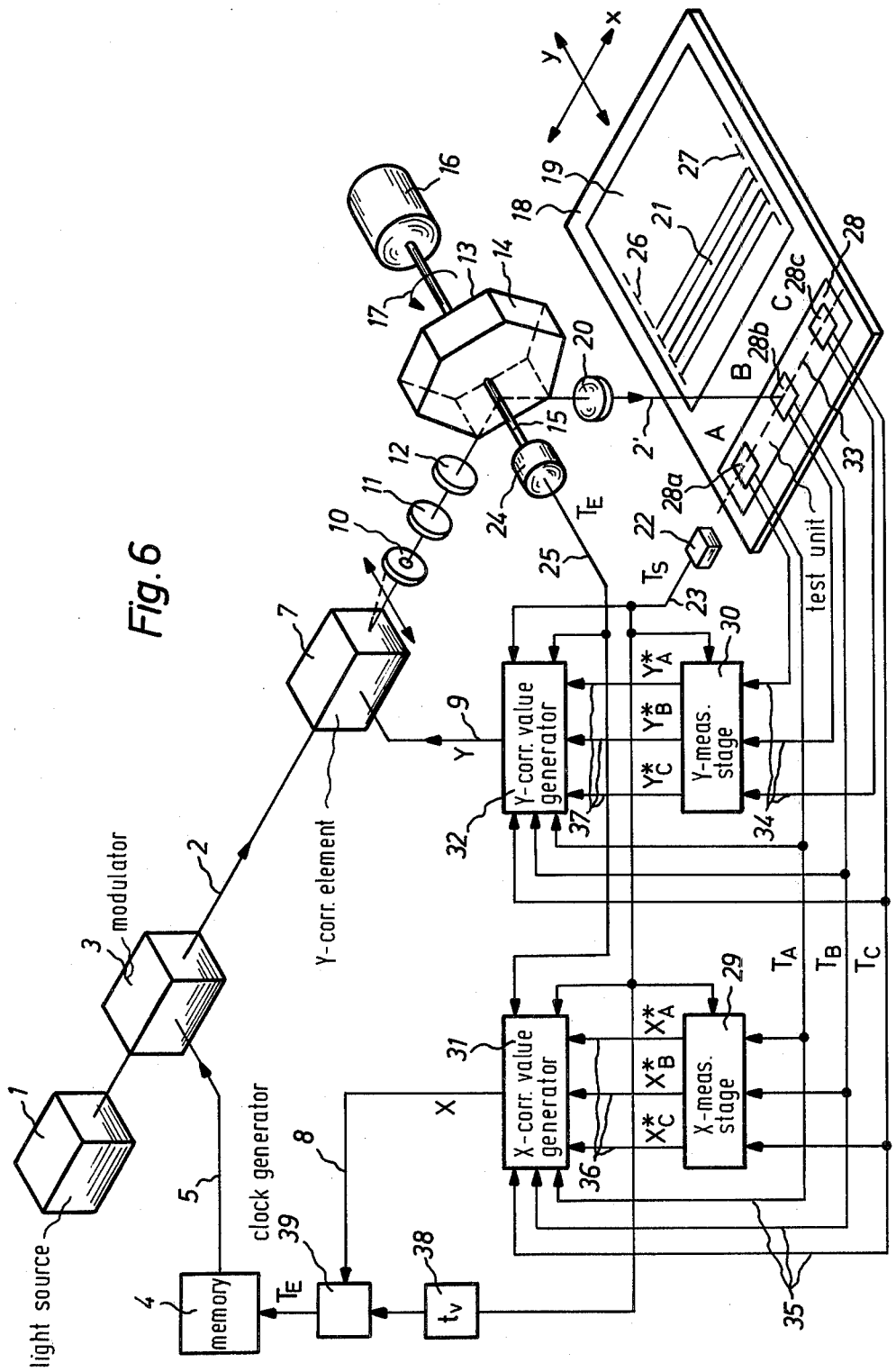
FIG. 6 is a schematic representation of a recording device of the type illustrated in FIG. 2 having a further exemplary embodiment of the correction circuit.

FIG. 6 illustrates an exemplary embodiment of the invention employing the correction arrangement according to FIG. 1. The difference with respect to FIG. 1 is that the error correction in the X-correction of the recording medium 19 is not carried out by deflecting the light beam in the X-direction but, rather, is carried out by a corresponding output control of the recording data from the digital memory 4. Therefore, the X-correction element 6 between the light modulator 3 and the Y-correction element 7 is eliminated.

The X-correction values emitted from the X-correction value generator 31 are now fed by way of the line 8 to the clock generator 39 and control the frequency of the read clock sequence $T_L$ for the memory 4.

The frequency control occurs in such a manner that the data output are changed by time intervals as a function of the determined X-position errors of the light beam 2' and, therefore, the X-position errors are compensated by a corresponding compression or elongation of the recording lines.

Alternatively to a change of frequency of the read clock sequence $T_L$, a time delay element controlled by the X-correction values can be provided between the digital memory 4 and the light modulator 3.

FIG. 7 illustrates a correction arrangement which is simplified in comparison to that of FIG. 6 in which one foregoes an automatic compensation of the X-positional errors.

A delay element 100, which is programmable with correction values, is disposed between the digital memory 4 and the light modulator 3.

In a simplified measuring stage 29', the appertaining line lengths Z and, therefrom, the appertaining length differences $\Delta Z$ are determined for all mirror surfaces 14 of the polyhedral rotating mirror 13 by time measurements with the assistance of the pulses $T_A$ and $T_C$ between the measuring points A and C. Half the line length differences $\Delta Z/2$ are programmed into the delay element 100 as correction values for each mirror surface of the polyhedral rotating mirror.

Controlled by the start pulses $T_S$ on the line 23, the stored correction values are called up during the recording synchronously with the mirror rotation and the recording data in each line read from the digital memory 4, and therefore, the line itself which is to be recorded, is shifted with respect to the first line in such a manner that the appertaining line length error is respectively divided between the line beginning and the line end.

We claim:

1. A method for the correction of position errors of a light beam generated by light beam generating means and deflected point-wise and line-wise across a scanning surface by deflection means of said light beam generating means, said deflection means having at least one mirror surface, said scanning surface moving transversally to the deflection or line direction of the light beam relative to the deflection means, comprising the steps of:

before the actual reading or recording operation measuring a plurality of position errors of the light beam for each mirror surface in the deflection direction (X-direction) as X-position errors and at right angles thereto (Y-direction) as Y-position errors at points oriented in the line direction in the area of the scanning surface;

generating X-position and Y-position correction values for the position errors for each mirror surface;

altering the light beam incidence by applying the correction values to the light beam generating means while simultaneously measuring the actual position errors;

rechecking the actual position errors and altering the correction values until the actual position errors are compensated by specific correction values;

storing said specific correction values; and during actual operation applying said stored specific correction values to the light beam generating means synchronously with the movement of said deflection means.

2. The method of position error correction of claim 1, wherein the step of altering the light beam incidence is further defined by the steps of:

controlling the deflection means of the light beam by the X-position correction values to move the incidence of the light beam in the X-direction and to compensate the X-position errors; and controlling the deflection means of the light beam by the Y-position correction values to move the incidence of the light beam in the Y-direction and to compensate the Y-position errors.

3. The method of position error correction of claim 2, wherein the deflection means have a first deflection system for position error correction and a second deflection system for the point-wise and line-wise deflection of the light beam, and wherein:

the step of controlling the first deflection system is performed before the point-wise and line-wise deflection of the light beam.

4. The method of position error correction of claim 3, and further comprising the step of:

rotating a polyhedral mirror as the second deflection system.

5. The method of position error correction of claim 1 for recording on the surface, wherein the light beam generating means has an intensity modulating means for modulating the light beam in response to an image signal and delay means to influence the transit time of said image signal and wherein the step of altering the light beam incidence is further defined by the steps of:

controlling the delay means by the X-position correction values to alter the incidence of the light beam in X-direction and to compensate the X-position errors; and controlling the deflection means of the light beam by the Y-position correction values to move the incidence of the light beam in Y-direction and to compensate the Y-position errors.

6. The method of position error correction of claim 5, and further comprising the step of:

generating a synchronizing start pulse for the beginning of each line.

7. The method of position error correction of claim 5, wherein the deflection means have a first deflection system for position error correction and a second deflection system for the point-wise and line-wise deflection of the light beam, and wherein:

the step of controlling the first deflection system is performed before the point-wise and line-wise deflection of the light beam.

8. The method of position error correction of claim 7, and further comprising the step of:

rotating a polyhedral mirror as the second deflection system.

9. The method of position error correction of claim 1 for recording on the surface, wherein the light beam generating means has intensity modulating means for modulating the light beam in response to an image signal and storage means for said image signal read out by a clock sequence and wherein the step of altering the light beam incidence is further defined by the steps of:

changing the frequency of said clock sequence by the X-position correction values to compensate the X-position errors; and controlling the deflection means of the light beam in Y-direction by the Y-position correction values to compensate the Y-position errors.

10. The method of position error correction of claim 9, and further comprising the step of:

generating a synchronizing start pulse for the beginning of each line.

11. The method of position error correction of claim 9, wherein the deflection means have a first deflection system for position error correction and a second deflection system for the point-wise and line-wise deflection of the light beam, and wherein:

the step of controlling the first deflection system is performed before the point-wise and line-wise deflection of the light beam.

12. The method of position error correction of claim 11, and further comprising the steps of:

rotating a polyhedral mirror as the second deflection system.

13. The method of position error correction of claim 1, and further comprising the steps of:

interpolating the correction values for each mirror surface to obtain a corresponding correction function.

14. The method of position error correction of claim 1, wherein the step of measuring the Y-position errors is further defined by the steps of:

for each measuring point sensing the intensity of the light beam opto-electronically at two locations arranged transversely to the deflection direction in said scanning surface to produce corresponding currents;

integrating the currents; and combining the two integrated currents differentially to generate the Y-position error signal of said measuring point.

15. The method of position error correction of claim 1, wherein the step of measuring the X-position errors is further defined by the steps of:

measuring the transit time of the light beam between the measuring points; and generating corresponding X-position error signals.

16. Correction apparatus for correcting X and Y position errors in a scanner in which a light beam producing system which has at least one moving mirror surface which moves the light beam point-wise and line-wise over a surface to be scanned, said correction apparatus comprising:

sensing means adjacent and substantially coplanar with the surface to be scanned, including sensing points oriented in the line direction, and operable to produce electrical signals for each mirror surface in response to scanning by the light beam identifying X and Y beam positions;

evaluation means connected to said sensing means and operable in response to the electrical signals to produce X and Y compensation signals;

compensation means coupled to the light beam producing system and connected to said evaluation means for altering the light beam incidence onto the deflection system in response to X and Y compensation signals; and control means for synchronously applying the X and Y compensation signals to said compensation means for each corresponding mirror surface.

17. The correction apparatus of claim 16, wherein said compensation means comprises:
X and Y correction elements for deflecting the light beam.

18. The correction apparatus of claim 17, wherein said compensation means comprises:
a programmable delay element connected to said evaluation means;
a light modulator in said light producing system; and
means producing image signals connected between said programmable delay element and said light modulator.

19. The correction apparatus of claim 17, and further comprising:
storage means storing image signals;
clock means connected to said storage means for clocking out the stored data at a clock frequency;
a modulator connected to said storage means and in said beam path for receiving data from said storage means to modulate the light beam; and
means connected between said evaluation means and said clock means for controlling the clock frequency.

20. The correction apparatus of claim 17, wherein said sensing means comprise:
a differential photodiode.

21. The correction apparatus of claim 17, wherein said sensing means comprises:
a high-resistant light-sensitive material.

22. The correction apparatus of claim 17, wherein the light beam producing system comprises:
an acousto-modulator connected to said compensation means for providing the altering the incidence.

23. The correction apparatus of claim 17, wherein the light beam producing system comprises:
a modulator for receiving image signals connected to said compensation means to alter the time of incidence of modulated data.

* * * * *